United States Patent [19]

Berry

[11] 4,191,584

[45] Mar. 4, 1980

[54] CEMENTITIOUS COMPOSITIONS

[75] Inventor: David Berry, Hull, England

[73] Assignee: BP Chemicals Limited, London, England

[21] Appl. No.: 900,754

[22] Filed: Apr. 27, 1978

[30] Foreign Application Priority Data

May 17, 1977 [GB] United Kingdom ............... 20676/77

[51] Int. Cl.$^2$ ................................................. C04B 7/35
[52] U.S. Cl. ........................................ 106/90; 106/315
[58] Field of Search ................................... 106/90, 315

[56] References Cited

U.S. PATENT DOCUMENTS

| 3,210,207 | 10/1965 | Dodson et al. | 106/90 |
| 3,619,221 | 11/1971 | Kossivas | 106/90 |
| 3,801,338 | 4/1974 | Whitaker | 106/315 |
| 4,033,782 | 3/1976 | Ray | 106/315 |

*Primary Examiner*—James Poer
*Attorney, Agent, or Firm*—Brooks, Haidt, Haffner & Delahunty

[57] ABSTRACT

This case relates to cementitious compositions containing calcium tetraformate as an accelerator.

7 Claims, No Drawings

CEMENTITIOUS COMPOSITIONS

The present invention relates to cementitious compositions. In particular, it relates to an additive for hydraulic cements which accelerates the setting of cement, and which is less corrosive to steel in reinforced concrete than conventional chloride based additives.

Hydraulic cements are defined as those cements that are capable to setting and hardening by the interaction of water with the constituents of the cement. Portland cement is an example of a class of hydraulic cements and is comprised essentially of calcium silicate. A common Portland cement comprises tricalcium silicate and dicalcium silicate, and a lesser amount of tricalcium aluminate and tetracalcium aluminoferrite. When mixed with water, Portland cement sets in a few hours and hardens over a period of weeks. The initial setting is caused by the interaction of water and the tricalcium aluminate. The subsequent hardening and development of cohesive strength result from the interaction of water and the tricalcium silicate. Both interactions are accompanied by the separation of a gelatinous hydrated product, which surrounds and binds the individual particles together.

Hydration of cement is a chemical change which is dependent on temperature. Since temperatures vary constantly, an effective means of controlling the hydration rate is essential to production of high quality concrete. This is particularly important in the preparation and use of concrete during winter when accelerated hydration is required to develop early strength, and for the prevention of the damaging effects of low temperatures. Accelerated setting is also desirable in the production of prefabricated concrete shapes to facilitate quick release from the moulds and in the production of ready mix concrete.

External heating has been suggested as a means of early hydration. A more general practice is the addition of an accelerator such as calcium chloride to the concrete mix. Calcium chloride has the advantage of low cost and is an effective accelerator for the setting of cements. However, it is used with reluctance in applications where concrete is in contact with metal, such as in re-inforced and pre-stressed concrete, because of its corrosive effect on steel re-inforcements particularly in structures of high porosity. In view of this legislation is proposed in the UK, and is in force in some European countries, against the use of such accelerators. Neutral calcium formate has been used as a chloride-free and less corrosive alternative to calcium chloride, especially when used in conjunction with a corrosion inhibitor. However, a major disadvantage of neutral calcium formate is its low water solubility (16 grams per 100 grams of water), which often restricts its use to a powder form. Solubility is an important factor since the uniformity of distribution of the accelerator within the concrete mix is essential if uneven setting and consequent development of stresses in the concrete structures is to be avoided.

It has now been found that the problems of solubility, activity and corrosion may all be minimised by using a complex acid salt of calcium.

Accordingly, the present invention is a cementitious composition comprising a cement accelerating admixture which is an aqueous solution of a calcium polyformate in which the molar ratio of calcium cation to the formate anion is between 1:3 and 1:8.

According to a further embodiment the present invention is a process for preparing cementitious compositions comprising adding to a cement mix an aqueous solution of a calcium polyformate in which the molar ratio of calcium cation to the formate anion is between 1:3 and 1:8.

The calcium polyformates as hereindefined are acidic salts of calcium in contrast to the neutral calcium formate. Acidic salts of this type are claimed and described in our British Patent Specification No. 1,505,388. Thus, examples of calcium polyformates which may be used in the cementitious compositions of the present invention include calcium triformate (ratio of $Ca^{++}$ to $HCOO^-$ 1:3) calcium tetraformate (ratio of $Ca^{++}$ to $HCOO^-$ 1:4) calcium pentaformate (ratio of 1:5) calcium hexaformate (ratio 1:6) and mixtures thereof.

Calcium polyformates may be formed by reacting excess formic acid with calcium hydroxide. Thus, calcium tetraformate may be formed by reacting aqueous formic acid (4 moles) with aqueous calcium hydroxide (1 mole) to produce an aqueous solution of the acid salt which has a pH of 3.0 but at the same time provides a safer means of adding formic acid to cement mixes. The concentration of the salt in this aqueous solution is approximately 22% by weight which is equivalent to a solubility of 27.5 grams of calcium tetraformate per 100 grams of water. A solution of the acid salt of similar strength can also be prepared by addition of aqueous formic acid (2 moles) to aqueous calcium formate (1 mole).

The calcium polyformates of the present invention when added to the cement mix reduce the viscosity of the mix. The viscosity appears to decrease with the increase in the acid content of the polyformate. This is a very useful asset particularly if mixes of low viscosity are desired. Furthermore, this characteristic affords the choice of reducing the amount of water used in preparing such mixes thus improving acceleration.

The amount of calcium polyformate added to the cement may vary between 0.2% and 5% by weight preferably between 0.2 and 3.5% by weight of the dry cement mix. The calcium polyformate is suitably added as an aqueous solution to the water used in the mixing process the amount of water used depending upon the desired viscosity of the mix. Calcium polyformates may be added to the cement mix alone or in admixture with calcium formate. An aqueous solution is preferred because the higher solubility of calcium polyformates enables a more uniform distribution of the additive within the concrete mix. The concepts of solubility and uniform distribution are relevant even if solid calcium polyformates are added, since water is always added to the cement mixes at some stage and calcium formate has a tendency to precipitate when used alone, thus affecting the strength of the structures.

The cementitious compositions of the present invention may contain one or more of the other conventional additives in addition to the calcium polyformates. For example it may contain agents for protection against corrosion and frost; concrete liquefying agents; surfactants or wetting agents; auxiliary inert materials such as for instance porous fillers, fibres and pigments; hydraulic binders; heat and sound insulating agents; synthetic resins and reinforcing agents; and sand.

The invention is further illustrated with reference to the following Examples.

EXAMPLES

In the examples which follow flexural strengths were measured on a concrete containing one part by weight Portland cement and 0.73 parts by weight of Buckland B sand. The average ratio of water to cement used was 0.35:1. The additives were added to the concrete mix as aqueous solutions.

The concrete test mixes were poured into moulds which were stored at room temperature and a relative humidity above 90%. After intervals of 2, 3, 7, 14 and 28 days flexural strengths were obtained from 4-point bend tests on eight samples of each test concrete. The samples (100 mm×15 mm×11 mm) were cut from the concrete the day prior to the tests, and stored at room temperature, and high humidity.

EXAMPLE 1

In this experiment flexural strengths were determined on concretes containing approximately equimolar amounts of calcium chloride, calcium formate and calcium tetraformate. The mean flexural strengths are presented below:

| Additive | Concentration of Additive % w/w Cement | Flexural Strength MN m$^{-2}$ | | | |
|---|---|---|---|---|---|
| | | 2 days | 3 days | 7 days | 14 days |
| Calcium Chloride | 1.50 | 1.8 | 4.1 | 6.8 | 6.6 |
| Calcium Formate | 1.77 | 4.5 | 7.4 | 7.8 | 8.0 |
| Calcium Tetraformate | 2.44 | 6.1 | 8.9 | 9.5 | 9.4 |

EXAMPLE 2

In these experiments flexural strengths were determined on concrete containing 2.5% w/w (based on % additive in dry weight of cement) of calcium chloride, calcium formate, calcium triformate, calcium tetraformate, and calcium pentaformate. The mean flexural strengths are presented below together with results obtained with concrete without additives for comparative purposes.

| Additive | Flexural Strength MN m$^{-2}$ | | | | |
|---|---|---|---|---|---|
| | 2 days | 3 days | 7 days | 14 days | 28 days |
| None* | 5.7 | 7.7 | 11.9 | 11.9 | 12.8 |
| Calcium* Chloride | 7.6 | 8.5 | 12.1 | 11.4 | 12.9 |
| Calcium* Formate | 7.3 | 8.9 | 11.8 | 13.1 | 15.1 |
| Calcium* Triformate | 7.2 | 8.6 | 12.5 | 11.7 | 11.0 |
| Calcium* Tetraformate | 6.9 | 9.1 | 12.7 | 13.2 | 13.0 |
| Calcium* Pentaformate | 7.0 | 8.5 | 9.0 | 12.7 | 12.3 |

*Comparative tests

EXAMPLE 3

(a) Qualitative corrosion tests were carried out to test the resistance of identical pieces of steel inserts embedded into separate cement mixes each dozed with identical concentrations of calcium chloride, calcium formate, calcium triformate and calcium tetraformate respectively in aqueous solution. After allowing the mixes to set, the inserts were removed and examined after a period of 14 days. In visual appearance the corrosive effect of mixes containing triformate and tetraformate showed lesser corrosion than those containing calcium formate and calcium chloride. The latter was the worst.

(b) Quantitative corrosion tests on some of the additives were also carried out as follows:

Mild steel rods (⅜ in OD) were polished and degreased and surrounded by a concrete composition containing various additives (setting accelerators) to produce reinforced concrete rods (1" OD, concrete+steel). The concrete rods were maintained at 22° C. and 90–95% relative humidity. After a period of six months the concrete rods were broken and the corrosion on the mild steel rods rated on a 10-point scale, 0 (no corrosion)—10 (total corrosion), for the various accelerating additives. The results are tabulated below:

| Additive | Concentration of additive % w/w of cement in mix | Corrosion rating after six months |
|---|---|---|
| None | — | 1–2 |
| Calcium formate | 5* | 1–2 |
| Calcium chloride | 1.5** | 10 |
| Calcium tetraformate | 3.0 | 0–1 |

*The sample of calcium formate used was very impure and hence a high concentration.
**Legally permitted limit in concrete.

I claim:

1. A cementitious composition comprising a cement mix and an aqueous solution of a calcium polyformate in which the molar ratio of calcium cation to the formate anion is between 1:3 and 1:8.

2. A cementitious composition according to claim 1 wherein the calcium polyformate is selected from the group consisting of calcium triformate, calcium tetraformate, calcium pentaformate, calcium hexaformate and mixtures thereof.

3. A cementitious composition according to claim 1 wherein the amount of calcium polyformate in the composition is between 0.2 and 5% by weight of the cement mix.

4. A process for preparing a cementitious composition comprising adding to a cement mix an aqueous solution of a calcium polyformate in which the molar ratio of calcium cation to the formate anion is between 1:3 and 1:8.

5. A process according to claim 4 wherein the aqueous solution of calcium polyformate is added to the water used in the mixing process.

6. A cementitious composition according to claim 1 wherein at least one other cement additive is present.

7. A cementitious composition according to claim 2 wherein at least one other cement additive is present.

* * * * *